US012729061B2

(12) United States Patent
Zhu

(10) Patent No.: US 12,729,061 B2
(45) Date of Patent: Sep. 8, 2026

(54) ROBOT CARGO SORTING SYSTEM CAPABLE OF IDENTIFYING SHELF TRANSFER, AND SORTING METHOD THEREOF

(71) Applicant: Zhejiang Libiao Robotics Co., Ltd., Zhejiang (CN)

(72) Inventor: Jianqiang Zhu, Zhejiang (CN)

(73) Assignee: Zhejiang Libiao Robotics Co., Ltd., Zhejiang (CN)

(*) Notice: Subject to any disclaimer, the term of this patent is extended or adjusted under 35 U.S.C. 154(b) by 389 days.

(21) Appl. No.: 18/281,354

(22) PCT Filed: Nov. 23, 2021

(86) PCT No.: PCT/CN2021/132455
§ 371 (c)(1),
(2) Date: Sep. 11, 2023

(87) PCT Pub. No.: WO2022/227519
PCT Pub. Date: Nov. 3, 2022

(65) Prior Publication Data

US 2024/0150117 A1 May 9, 2024

(30) Foreign Application Priority Data

Apr. 30, 2021 (CN) ........................ 202110478895.X

(51) Int. Cl.
*B65G 1/10* (2006.01)
*B07C 5/36* (2006.01)
(Continued)

(52) U.S. Cl.
CPC .................. *B65G 1/10* (2013.01); *B07C 5/36* (2013.01); *B65G 1/0435* (2013.01);
(Continued)

(58) Field of Classification Search
CPC ...... B65G 1/10; B65G 1/0492; B65G 1/0435; B65G 1/1371; B65G 1/0407;
(Continued)

(56) References Cited

U.S. PATENT DOCUMENTS

| | | | | |
|---|---|---|---|---|
| 9,248,965 | B1 | 2/2016 | Kritchevsky | |
| 2012/0029687 | A1 | 2/2012 | Hagen et al. | |
| 2022/0153521 | A1* | 5/2022 | Chen | G06V 20/52 |

FOREIGN PATENT DOCUMENTS

| | | | |
|---|---|---|---|
| CN | 105292892 | A | 2/2016 |
| CN | 106743011 | A | 5/2017 |

(Continued)

OTHER PUBLICATIONS

International Search Report of WO2022227519, dated Feb. 11, 2022.

(Continued)

*Primary Examiner* — Thomas Randazzo
(74) *Attorney, Agent, or Firm* — Warner Norcross + Judd LLP

(57) ABSTRACT

The robot cargo sorting system capable of identifying shelf transfer, and a sorting method thereof are provided. The sorting system includes: movable shelves, each provided with cargo boxes configured for allowing cargoes to be unloaded thereinto, fixed with identification devices and capable of moving to any vacant unloading region; sorting robots, capable of travelling on a sorting platform and transporting received cargoes to a designated unloading region for unloading; a sorting robot locating device; an importing device; unloading robots, capable of receiving cargoes unloaded from the sorting robots and unloading the cargoes into predetermined vacant cargo boxes of the movable shelves; detection devices, which can acquire information of the identification devices; and a server, in wireless connection with controllers of the sorting robots and in (Continued)

wired or wireless connection with controllers of the unloading robot, the detection devices and the importing device.

20 Claims, 3 Drawing Sheets

(51) Int. Cl.
*B65G 1/04* (2006.01)
*B65G 1/06* (2006.01)
*B65G 1/137* (2006.01)

(52) U.S. Cl.
CPC ............ *B65G 1/0492* (2013.01); *B65G 1/06* (2013.01); *B65G 1/1371* (2013.01); *B65G 1/1378* (2013.01); *B07C 2501/0063* (2013.01); *B65G 1/0407* (2013.01); *B65G 2201/02* (2013.01)

(58) Field of Classification Search
CPC ...... B65G 1/1378; B65G 1/0485; B65G 1/06; B65G 2201/02; B07C 2501/0063; B07C 5/36; B07C 5/342
See application file for complete search history.

(56) References Cited

FOREIGN PATENT DOCUMENTS

| | | | | | |
|---|---|---|---|---|---|
| CN | 207434322 | U | | 6/2018 | |
| CN | 207489084 | U | | 6/2018 | |
| CN | 108750511 | A | | 11/2018 | |
| CN | 109264283 | A | | 1/2019 | |
| CN | 109377127 | A | | 2/2019 | |
| CN | 107215601 | A | | 4/2019 | |
| CN | 109573443 | A | | 4/2019 | |
| CN | 109835651 | A | | 6/2019 | |
| CN | 209038363 | U | | 6/2019 | |
| CN | 110171660 | A | | 8/2019 | |
| CN | 111620015 | A | * | 9/2020 | B65G 1/1373 |
| CN | 112389916 | A | | 2/2021 | |
| CN | 112573075 | A | | 3/2021 | |
| CN | 113210294 | A | | 8/2021 | |
| DE | 4215101 | A1 | | 11/1992 | |
| EP | 3265884 | B1 | * | 7/2025 | B65G 67/04 |
| JP | S62-140903 | A | | 6/1987 | |
| JP | 2018-507829 | A | | 3/2018 | |
| JP | 2019-025566 | A | | 2/2019 | |
| JP | 2020-111467 | A | | 7/2020 | |
| KR | 20080002289 | A | | 1/2008 | |
| WO | WO-2020093902 | A1 | * | 5/2020 | B07C 5/362 |
| WO | WO-2021063328 | A1 | * | 4/2021 | G06Q 10/08 |

OTHER PUBLICATIONS

Written Opinion of the International Search Authority of WO2022227519, dated Feb. 23, 2022.
First Office Action of Priority Application CN202110478895X, dated, Mar. 24, 2022.
Second Office Action of Priority Application CN202110478895X, dated, Apr. 24, 2022.
First Search of Priority Application CN202110478895X, dated, Mar. 16, 2022.
Supplementary Search Report of Priority Application CN202110478895X, dated, Apr. 14, 2022.
Notification to Grant Patent Right for Invention of Priority Application CN202110478895X, dated May 27, 2022.
First Office Action of TW Family Application No. 11120842570, dated Aug. 29, 2022.
Decision to Grant a Patent of TW Family Application No. 11220124100, dated Feb. 9, 2023.

* cited by examiner

ROBOT CARGO SORTING SYSTEM CAPABLE OF IDENTIFYING SHELF TRANSFER, AND SORTING METHOD THEREOF

CROSS-REFERENCE TO RELEVANT APPLICATIONS

The present disclosure claims the priority of the Chinese patent application filed with the China National Intellectual Property Administration on Apr. 30, 2021 with the application number of 202110478895.X, entitled "ROBOT CARGO SORTING SYSTEM CAPABLE OF IDENTIFYING SHELF TRANSFER, AND SORTING METHOD THEREOF", the content of which is incorporated herein in its entirety by reference.

TECHNICAL FIELD

The present disclosure relates to a robot cargo sorting system capable of identifying shelf transfer and a sorting method thereof.

BACKGROUND ART

Sorting and unloading cargoes by sorting robots, that is, self-navigation carts has been widely used. In the related technologies, cargoes are usually unloaded at a predetermined outlet according to demands. For example, cargoes are unloaded at different outlets according to the division of regions, and then the cargoes at the same outlet are packed and transported. There is a kind of demand that cargoes are unloaded into a predetermined cargo box on a shelf, and because one shelf may be provided with a plurality of cargo boxes, as long as the cargoes are transported to the packing place, all cargoes may be conveniently transported to the packing places of other regions for packing. In order to further improve the ability to handle cargoes, it is necessary to perform sorting through a plurality of shelves at the same time.

SUMMARY

According to the above requirements, the present disclosure provides a robot cargo sorting system capable of identifying shelf transfer and a sorting method thereof.

The technical solution of the present disclosure is as follows.

A robot cargo sorting system capable of identifying shelf transfer (i.e., a cargo sorting system based on robots capable of identifying shelf transfer) may include:

- a plurality of movable shelves, each of which is provided with a plurality of cargo boxes that are configured for allowing cargoes to be unloaded thereinto, wherein the each of the movable shelves is fixed with at least one identification device and is configured to be capable of moving to any unoccupied unloading region, and the plurality of the movable shelves can be arranged in parallel;
- a plurality of sorting robots, which are capable of traveling on a sorting platform, wherein each of the sorting robots is capable of transporting received cargoes to a designated unloading region for unloading the received cargoes;
- a sorting robot locating device, which is capable of locating the plurality of the sorting robots;
- at least one importing device, which is provided at a cargo entrance of the sorting platform, and is capable of identifying and importing the cargoes;
- unloading robots, which are capable of receiving cargoes unloaded by the sorting robots, and unloading cargoes into predetermined unoccupied cargo boxes of the movable shelves;
- detection devices, each of which is fixed on a ground of a corresponding unloading region, or on an unmovable fixed element in a corresponding unloading robot, wherein the detection devices are each capable of collecting information and spatial orientation of the corresponding identification device; and
- a server, which is connected to controllers of the plurality of the sorting robots in a wireless manner, and connected to controllers of the unloading robots, the detection devices, and the at least one importing device in a wired or wireless manner.

Optionally, each of the unloading robots includes a vertical moving device, two horizontal moving devices that are arranged in parallel, and a flipping device, wherein each of the horizontal moving devices includes:

- a hollow rod, which is fixed to the ground by a bracket, wherein the hollow rod is mounted horizontally and provided with an opening end, and two outer side surfaces of the hollow rod are provided with grooves;
- a first synchronous pulley and a second synchronous pulley, which are rotatably fixed at two ends inside the hollow rod, respectively;
- a synchronous belt, which connects the first synchronous pulley and the second synchronous pulley;
- a servomotor, which has a housing fixed to the hollow rod, and a rotating shaft fixed to a central axis of the first synchronous pulley or a central axis of the second synchronous pulley, wherein the servomotor is electrically connected to the controller of the unloading robot; and
- a sliding block, which is provided with a protrusion block and two sliding rails, wherein the protrusion block is capable of being embedded in the opening end of the hollow rod and is fixed to the synchronous belt, and the sliding rails are only capable of moving back and forth along the grooves, wherein a structure of the vertical moving device is the same as structures of the horizontal moving devices, the hollow rod of the vertical moving device is vertically arranged, and two ends of the hollow rod of the vertical moving device are fixed to sliding blocks of the two horizontal moving devices, respectively; and the flipping device may include:

- a conveying frame, which is fixed to the sliding block of the vertical moving device;
- a first decelerator;
- a flipping motor, which has a housing fixed to a housing of the first decelerator, and a rotating shaft fixed to an input shaft of the first decelerator, wherein the flipping motor is electrically connected to the controller of the unloading robot;
- at least one flipping bracket, which is fixed to an output shaft of the first decelerator;
- a flipping plate, which is fixed to the at least one flipping bracket, wherein the flipping plate is capable of holding or unloading the cargoes;
- a second decelerator, a housing of which is fixed to the conveying frame;
- a swing motor, which has a housing fixed to the housing of the second decelerator, and a rotating shaft fixed to an input shaft of the second decelerator, wherein the swing motor is electrically connected to the controller of the unloading robot; and at least one swing rod, which has one end fixed to an output shaft of the second decelerator, and the other end fixed to the housing of the first decelerator, wherein rotation of the swing motor can drive the flipping plate with cargoes to swing from an outside of the corresponding movable shelf to above a predetermined cargo box, and rotation of the flipping motor can unload the cargoes into the cargo box.

Optionally, the two horizontal moving devices that are arranged in parallel are capable of controlling the vertical moving device to move in a length direction of the corresponding movable shelf.

Optionally, the vertical moving device is capable of controlling the flipping device to move in a height direction of the corresponding movable shelf.

Optionally, the flipping device is capable of controlling the cargoes to move in a circumferential trajectory in a horizontal direction, and is further capable of flipping to unload the cargoes.

Optionally, the flipping device may include two swing rods, located at a top surface and a bottom surface of the housing of the first decelerator, respectively.

Optionally, the each of the movable shelves is provided as being of a plurality of layers, each of the plurality of layers is provided with a plurality of cargo boxes, a plurality of cargo boxes on the plurality of layers are arranged in a matrix, and the each of a plurality of cargo boxes is detachable.

Optionally, the flipping plate is capable of unloading the cargoes onto any one of the movable shelves at two sides.

Optionally, each of the unloading regions may be provided with two detection devices, and correspondingly, the each of the movable shelves is provided with two identification devices, and when the two detection devices are aligned with the two identification devices respectively, the each of the movable shelves is accurately located.

Optionally, the identification devices may be two-dimensional codes or barcodes, the detection devices are cameras; or, the identification devices are RFID electronic tags, and the detection devices are card readers.

Optionally, the detection devices are each fixed on a sorting site or on the unmovable fixed elements of the corresponding unloading robot.

A robot cargo sorting method capable of identifying shelf transfer (i.e. a cargo sorting method based on robots capable of identifying shelf transfer), appliable to the robot cargo sorting system capable of identifying shelf transfer. The sorting method of the robot cargo sorting system includes the following steps:

S1. selecting one movable shelf, on which at least one cargo box is an unoccupied cargo box without cargoes, and moving the movable shelf to any unoccupied unloading region for waiting for unloading (i.e., being loaded or receiving unloaded cargoes);

S2. reading the at least one identification device of the movable shelf on the unloading region through at least one detection device fixed on the unloading region;

S3. the server starting dispatch according to information of the c unoccupied cargo box on the movable shelf, unloaded cargoes, and cargoes to be unloaded, obtained from the at least one identification device;

S4. transporting cargoes by sorting robots to a place close to the unloading region, when the cargoes sorted by the sorting robots need to be unloaded into the at least one unoccupied cargo box;

S5. the unloading robot of the unloading region receiving the cargoes unloaded by the sorting robots and then unloading the cargoes into predetermined unoccupied cargo boxes; and S6. the movable shelf 2 moving to a packing region for packing, after the at least one unoccupied cargo box on the movable shelf is filled with predetermined cargoes.

Optionally, that at least one cargo box in the plurality of cargoes on the movable shelf is unoccupied cargo box without cargoes in the step S1 refers to that: the movable shelf is not loaded with cargoes; the movable shelf finishes unloading of cargoes and is ready to be loaded with cargoes again (i.e. ready to receive cargoes again); or, the movable shelf is loaded with cargoes before, but the unloading is interrupted when the movable shelf is not full of the cargoes, so that the unloading region and the unloading robot need to be replaced to continue the unloading.

Optionally, when one of the unloading robots needs to be interrupted, an adjacent unloading robot may unload cargoes on the movable shelf after re-dispatching by the server.

Compared with the related technologies, the present disclosure at least has the following advantages. The sorting robots, one by one in loop (circulation), may load and unload cargoes, the number of outlets is large, and the sorting efficiency is high. The sorting platform may be provided as being of a single layer or a plurality of layers, enabling large sorting quantity. The movable shelves store a lot of cargoes, enabling high space utilization rate. The movable shelves may be moved, which are very flexible, enabling high site utilization rate. The unloading robots occupy a small region, and the requirement for locating accuracy is not high, which is beneficial to reduce costs. When an unloading robot fails, it may be quickly resolved. The packing region may be flexibly set without affecting the sorting of the sorting site.

The present disclosure has the beneficial effects of a compact structure, a large sorting amount, sufficient space utilization, and a high sorting efficiency.

DETAILED DESCRIPTION OF EMBODIMENTS

The present disclosure is further described in conjunction with the figures.

Figure 1:
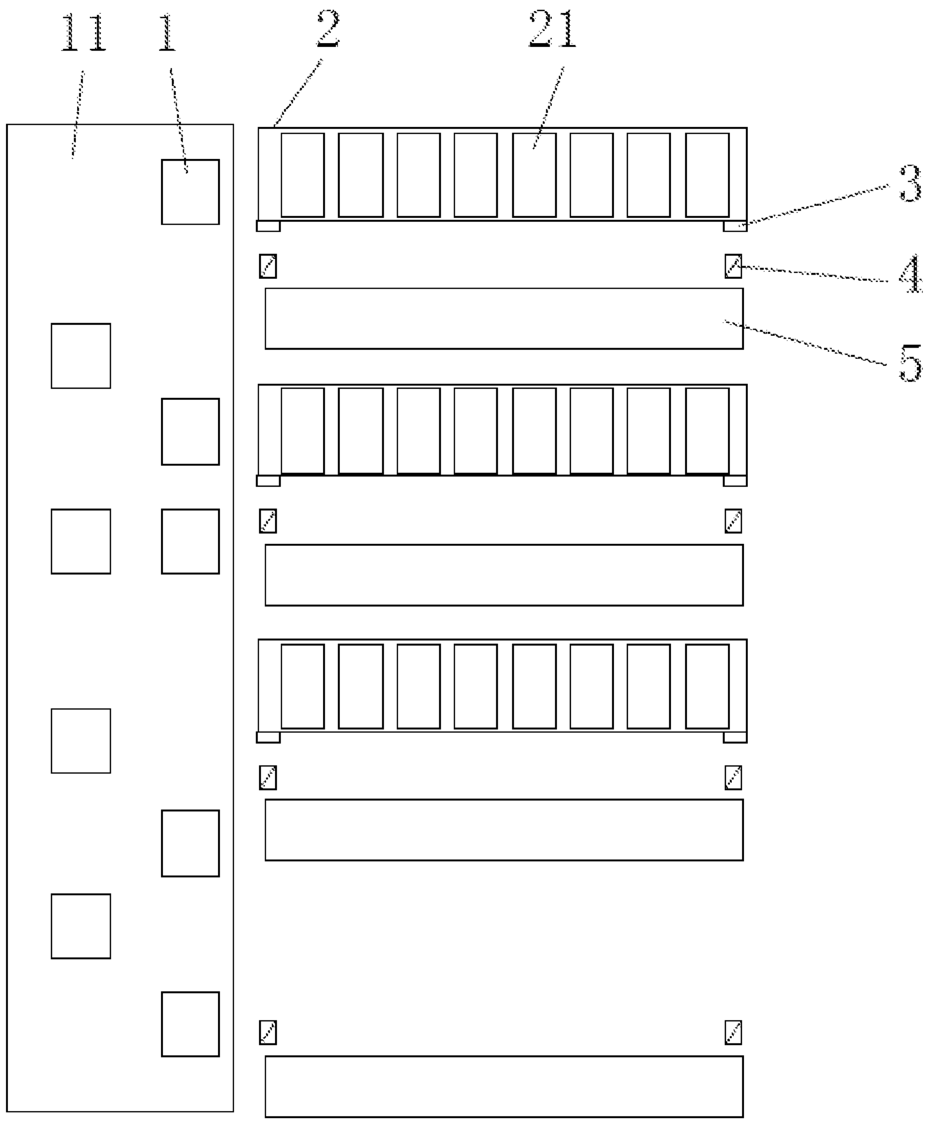
FIG. 1 is a schematic diagram of the overall structure of the present disclosure.

As shown in FIG. 1, a robot cargo sorting system capable of identifying shelf transfer includes: a plurality of movable shelves 2, each movable shelf 2 is provided with a plurality of cargo boxes 21 that are configured for allowing cargoes to be unloaded thereinto. In the present embodiment, each movable shelf is provided as being of a plurality of layers, each layer is provided with a plurality of cargo boxes 21, and the cargo boxes 21 are arranged regularly in a matrix. Each movable shelf 2 is fixed with identification devices 3, and each movable shelf 2 is capable of moving to any unoccupied unloading region. In FIG. 1 of the present embodiment, the plurality of the movable shelves 2 are arranged in parallel. Actually, the plurality of the movable shelves 2 may also be arranged around the sorting platform 11, to further improve the utilization rate of the site.

In order to take cargoes conveniently, each layer of the movable shelf 2 is provided with two parallel rungs 22, each cargo box 21 is provided with two corresponding flanges, and the two flanges of the cargo box 21 are capable of being pressed on the two rungs 22.

A plurality of sorting robots 1 are provided, and are capable of traveling on a sorting platform 11, and each of the sorting robots 1 is capable of transporting the cargoes received at a cargo entrance to a designated unloading region for unloading the cargoes. The sorting robots 1 are usually self-navigation carts, which may circularly transport cargoes along the sorting platform 11. A cargo outlet is usually set at the edge of the sorting platform 11. When a sorting robot 1 is unloading cargoes, the cargoes may be poured out only by flipping the flipping plate. The sorting platform 11 usually has a certain height. The sorting platform 11 may be provided as being of a plurality of layers, and the sorting robots 1 may be arranged on each layer of the sorting platform 11.

A sorting robot locating device is capable of locating the plurality of the sorting robots 1. The locating may be performed by using a wireless locating system, or pasting two-dimensional code(s), barcode(s), etc., on the sorting platform 11. Each sorting robot 1 is provided with a camera to collect the position information of the two-dimensional code(s) and the barcode(s). This part is the related technology.

At least one importing device may be fixed at the cargo entrance of the sorting platform 11, or the at least one importing device may also be manually held to identify and import the cargoes. The importing device may be a code scanning device, which may identify the cargoes. The cargoes are usually pasted with two-dimensional codes or barcodes, so correspondingly, the scanning device is a two-dimensional code or barcode scanner. Generally speaking, after the cargoes are manually transported to the scanning device for scanning, the cargoes are placed on the sorting robots 1 at the cargo entrance(s). The cargo entrance may be provided at any position of the sorting platform 11 except for the position of the outlet. The importing device may also be a robot arm (manipulator), which may transport the cargoes to the sorting robots 1. The server may obtain specific information about the cargoes transported by the robot arm, such as knowing that the cargoes are toothbrushes.

The unloading robots 5 are capable of receiving cargoes unloaded by the sorting robot 1, and unloading the cargoes into predetermined unoccupied cargo boxes 21 on the movable shelf 2. Obviously, the unloading robots 5 are arranged along the edge of the sorting platform 11.

The detection devices 4 are fixed on the ground of unloading regions, or on unmovable fixed elements in the unloading robots 5. The detection devices 5 are capable of collecting the information of the identification devices 3, and may also collect spatial orientations. In the present embodiment, the identification devices 3 are two-dimensional codes or barcodes, and correspondingly, the detection devices 4 are cameras, or, the identification devices are RFID electronic tags in wireless communication, and correspondingly, the detection devices are card readers in wireless communication.

A server is in wireless connection with controllers of the sorting robots 1, and in wired or wireless connection with controllers of the unloading robots 5, the detection devices 4, and the importing device.

In the present embodiment, the server may perform sorting according to the attributes of the cargoes, for example, at least one of the following: cargoes belong to a certain customer, cargoes belong to a certain shelf, cargoes belong to a certain supplier, cargoes belong to a certain express delivery region, and cargoes belong to a certain courier delivery man. Several cargoes of a certain client may be sorted into different cargo boxes 21 of the same movable shelf 2, and the same movable shelf 2 may store cargoes of a plurality of clients. Several cargoes of a certain supplier may be sorted into different cargo boxes 21 of the same movable shelf 2, and the same movable shelf 2 may store a plurality of cargoes of the same supplier.

Figure 2:
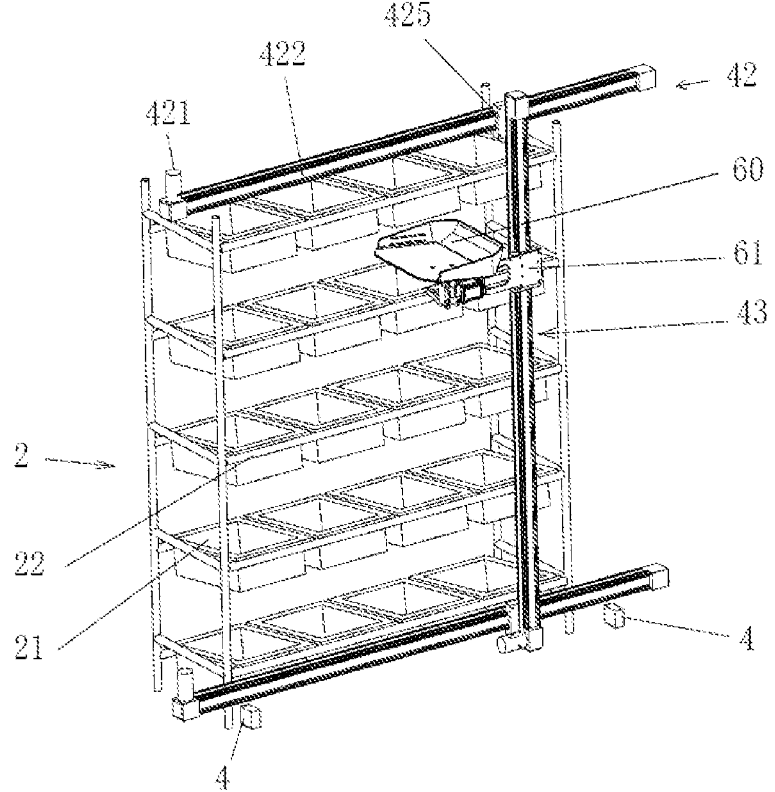
FIG. 2 is a schematic diagram of the main structures of an unloading robot and a movable shelf of the present disclosure.
Figure 3:
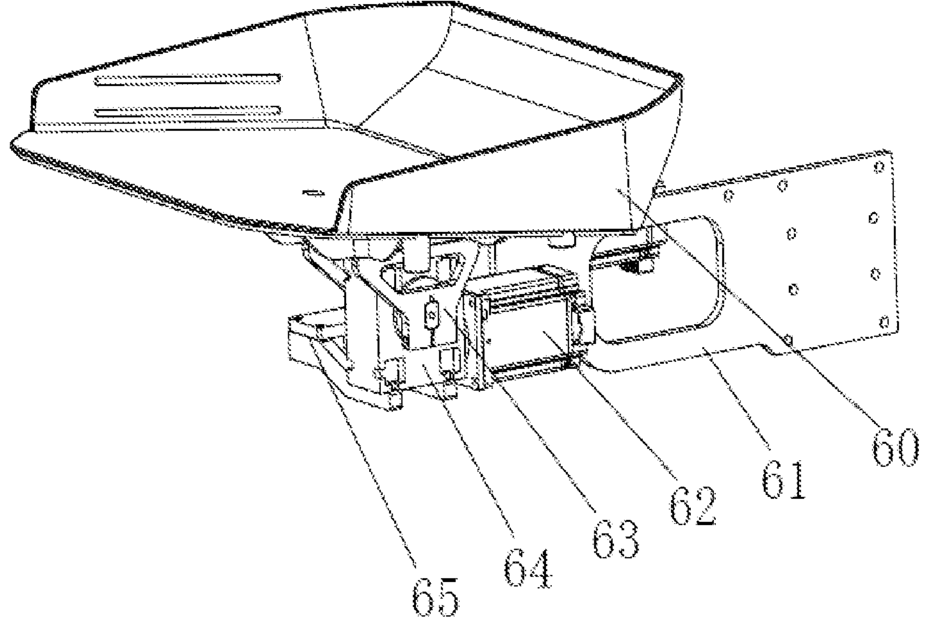
FIG. 3 and FIG. 4 are structural schematic diagrams of a flipping device of the present disclosure.
Figure 4:
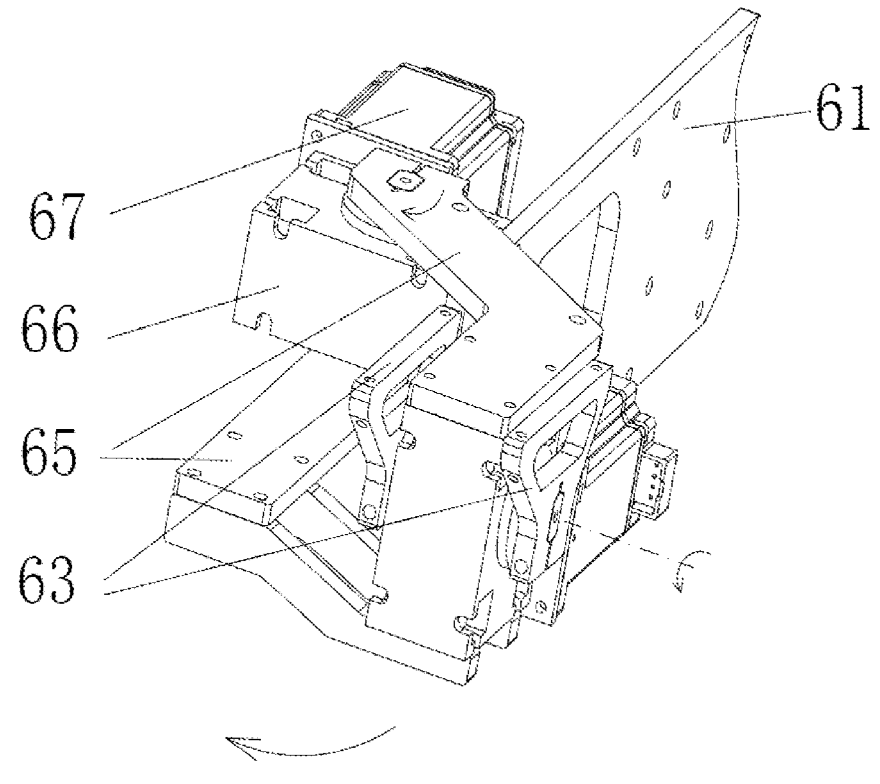
Figure 5:
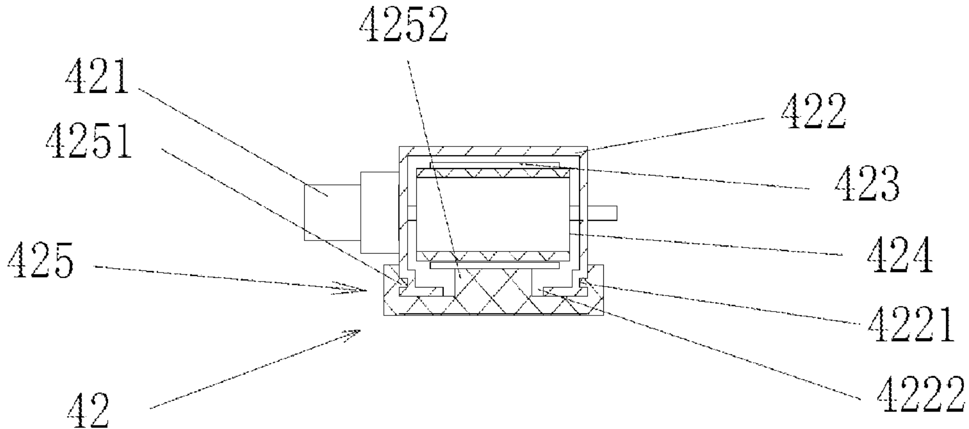
FIG. 5 is a structural schematic diagram related to hollow rods of a vertical moving device and a horizontal moving device of the present application.

Optionally, as shown in FIG. 2, FIG. 3, and FIG. 4, each unloading robot 5 may include a vertical moving device 43, two horizontal moving devices 42 that are arranged in parallel, and a flipping device, wherein each horizontal moving device 42 may include:

a hollow rod 422, which is fixed to the ground by a bracket, wherein the hollow rod 422 is mounted horizontally and provided with an opening end 4222, and two outer side surfaces of the hollow rod 422 are provided with grooves 4221;

a first synchronous pulley 424 and a second synchronous pulley, which are rotatably fixed at two ends of the hollow rod 422, respectively;

a synchronous belt 423, which connects the first synchronous pulley 424 and the second synchronous pulley;

a servomotor 421, which has a housing fixed to the hollow rod 422, and a rotating shaft fixed to a central axis of the first synchronous pulley 424 or a central axis of the second synchronous pulley, wherein the servomotor 421 is electrically connected to the controller of the unloading robot 5; and a sliding block 425, which is provided with a protrusion block 4252 and two sliding rails 4251, wherein the protrusion block 4252 is capable of being embedded in the opening end 4222 of the hollow rod 422, and is fixed to the synchronous belt 423, and the two sliding rails 4251 are only capable of moving back and forth along the grooves 4221 wherein a structure of the vertical moving device 43 is the same as that of the horizontal moving device 42, with the difference therebetween lying in that: the hollow rod 422 of the vertical moving device 43 is vertically arranged, and two ends of the hollow rod 422 of the vertical moving device 43 are fixed to the sliding blocks 425 of the two horizontal moving devices 42, respectively.

The structure of the vertical moving device 43 is the same as that of the horizontal moving devices 42, which may simplify the overall structure and facilitate maintenance.

The flipping device includes:

a conveying frame 61, which is fixed to the sliding block 425 of the vertical moving device 43;

a first decelerator 64;

a flipping motor 62, which has a housing fixed to a housing of the first decelerator 64, and a rotating shaft fixed to an input shaft of the first decelerator 64, wherein the flipping motor 62 is electrically connected to the controller of the unloading robot 5;

a flipping bracket 63, which is fixed to an output shaft of the first decelerator 64, wherein in the present embodiment, two flipping brackets 63 are symmetrically arranged in order to improve stability;

a flipping plate 60, which is fixed to the flipping bracket 63, wherein the flipping plate 60 is capable of holding or unloading cargoes;

a second decelerator 66, a housing of which is fixed to the conveying frame 61;

a swing motor 67, which has a housing fixed to the housing of the second decelerator 66, and a rotating shaft fixed to an input shaft of the second decelerator 66, wherein the swing motor 67 is electrically connected to the controller of the unloading robot 5; and a swing rod 65, which has one end fixed to an output shaft of the second decelerator 66, and the other end fixed to the housing of the first decelerator 64. In the present embodiment, two swing rods 65 are provided, which are located at the top surface and the bottom surface of the housing of the first decelerator 64 respectively, to improve stability.

The rotation of the swing motor 67 may drive the flipping plate 60 with the cargoes to swing from the outside of the movable shelf 2 to above a predetermined cargo box 21, and the rotation of the flipping motor 62 can unload the cargoes into the cargo box 21.

The two horizontal moving devices 42 that are arranged in parallel are capable of controlling the vertical moving device 43 to move in a length direction of the corresponding movable shelf, the vertical moving device 43 is capable of controlling the flipping device to move in a height direction of the corresponding movable shelf, and the flipping device is capable of controlling cargoes to move along a circumferential trajectory in a horizontal direction, and is also capable of flipping to unload the cargoes.

The unloading robot 5 adopts an open-loop control mode, and the servomotor 421 in the vertical moving device 43 is controlled by software, so that the cargoes may be moved to a designated layer accurately, and the servomotor 421 in each of the horizontal moving devices 42 is controlled by software, so that the cargoes may be moved to a designated column accurately. Due to the relatively large size of each of the cargo boxes 21, the flipping device may accurately locate the predetermined cargo box 21 for unloading. Similarly, the flipping device may also accurately move to the edge of the sorting platform 11 to receive the cargoes unloaded by the sorting robot 1. The cost of hardware may be reduced by using this control method, and there is no need for each of the cargo boxes 21 to be equipped with a sensor.

In order to improve unloading efficiency, and improve the utilization rate of unloading robots 5, the flipping plate 60 is capable of unloading the cargoes on any one of the movable shelves 2 at two sides.

The movable shelves 2 may be moved manually or by handling robots. In order to accurately locate the movable shelves 2, each unloading region is provided with two detection devices 4, and correspondingly, each of the movable shelves 2 is provided with two identification devices. When the two detection devices 4 are aligned with the two identification devices 3 respectively, the movable shelf 2 is accurately located. The two pairs of identification devices 3 and the detection devices 4 of the present disclosure have the functions of locating the movable shelf and reading the information of the movable shelf 2, that is, one thing achieves dual purposes.

As a preferable embodiment, the detection device 4 is fixed on the sorting site or on the unmovable fixed element of the unloading robot. The detection device 4 may be fixed on the bracket.

The initial position of each motor of the present disclosure may be obtained by setting limit locations, or, the initial position of each motor may be located by providing an initial-position senor. For example, the sliding block 425 may be blocked when it moves to a limit position where it may touch the first synchronous pulley 424 or the second synchronous pulley, and the locked-rotor current of the motor will be increased. The controller may use this position as the initial position of the motor to calculate how much distance that the sliding block 425 moves when the motor rotates a circle. It may also be achieved by providing the initial-position sensor, wherein when the sliding block 425 touches the initial-position sensor, the position is the initial position of the motor. Similarly, the initial positions of the flipping motor 62 and the swing motor 67 may also be obtained by setting limit position or initial-position sensors.

In a robot cargo sorting method capable of identifying shelf transfer, the robot cargo sorting system capable of identifying shelf transfer as mentioned above is used, and the sorting method of the robot cargo sorting system includes the following steps:

S1. selecting one of the movable shelves 2, wherein at least one of the cargo boxes 21 on the movable shelf 2 is the unoccupied cargo box 21 without cargoes; moving the movable shelf 2 to any unoccupied unloading region for waiting for unloading, wherein there are usually three kinds of situations: first, the movable shelf 2 is not loaded with cargoes; second, the movable shelf 2 finishes unloading of cargoes and is ready to be loaded with cargoes again; and third, the movable shelf 2 is loaded with cargoes before, but the unloading is interrupted when the movable shelf 2 is not full of the cargoes, so that the unloading region and the unloading robot 5 need to be replaced to continue the unloading, and the reasons for the interruption here may be that the unloading robot 5 fails, or the sorting site needs to be changed.

S2. reading the identification devices 3 of the movable shelf 2 on the unloading region, through the detection devices 4 fixed on the unloading region;

S3. the server starting dispatch according to the information of the unoccupied cargo box 21 on the movable shelf 2, unloaded cargoes and cargoes to be unloaded, obtained from the identification devices 3, wherein for example, according to the original plan, No. 1 unloading robot 5 completes the storing of three cargoes in No. 1, No. 2, and No. 3 cargo boxes 21 on No. 1 movable shelf 2 respectively, but due to that No. 1 unloading robot 5 breaks down and needs to be interrupted, the last cargo is not yet stored in the No. 3 cargo box 21, so at this moment, the first remedial scheme is that No. 1 movable shelf 2 is manually moved to the unoccupied No. 10 unloading region, the server obtains this information through the detection devices 4 of the No. 10 unloading region, and if the server obtains that a certain sorting robot is loaded with the third cargo, the third cargo is transported to No. 10 unloading region where the No. 10 unloading robot 5 is located, and the cargo is unloaded into the No. 3 cargo box 21 by No. 10 unloading robot 5; and the second remedial scheme is that the cargo is unloaded into the No. 3 cargo box 21 on the No. 1 movable shelf 2 by an adjacent unloading robot such as No. 2 unloading robot 5;

S4. transporting the cargoes by the sorting robots to a place close to the unloading region, when the cargoes sorted by the sorting robots need to be unloaded into the unoccupied cargo box 21;

S5. the unloading robot of the unloading region receiving the cargoes unloaded by the sorting robots and then unloading the cargoes into predetermined unoccupied cargo box(es) 21; and S6. the movable shelf moving to a packing region for packing, after the unoccupied cargo box on the movable shelf 2 is filled with predetermined cargoes, wherein obviously, other unloading regions are also equipped with the detection devices 4, and after reading the identification devices 3, the information of each of the cargo boxes 21 may be obtained through the server.

INDUSTRIAL APPLICABILITY

The present disclosure provides a robot cargo sorting system capable of identifying shelf transfer and a sorting method thereof. The sorting system includes: a plurality of movable shelves, each of which is provided with a plurality of cargo boxes that are configured for allowing cargoes to be unloaded thereinto, wherein the each of the movable shelves is fixed with identification device(s) and is capable of moving to any unoccupied unloading region; a plurality of sorting robots, which are capable of traveling on a sorting platform, wherein each of the sorting robots is capable of transporting received cargoes to a designated unloading region for unloading the received cargoes; a sorting robot locating device; at least one importing device; a unloading robots, which are capable of receiving the cargoes unloaded by the sorting robots, and unloading the cargoes into predetermined unoccupied cargo boxes of the movable shelves; detection devices, which are capable of collecting information of the identification devices; and a server, which is connected to controllers of a plurality of the sorting robots in a wireless manner, and connected to controllers of the unloading robots, the detection devices, and the at least one importing device in a wired or wireless manner. The present disclosure has the beneficial effects of a compact structure, a large sorting amount, sufficient space utilization, and a high sorting efficiency.

In addition, it may be understood that the robot cargo sorting system capable of identifying shelf transfer and sorting method thereof of the present disclosure may be reproduced, and may be used in various industrial applications. For example, the robot cargo sorting system capable of identifying shelf transfer and sorting method thereof of the present disclosure may be used in the technical field of sorting cargoes by sorting robots.

What is claimed is:

1. A robot cargo sorting system capable of identifying shelf transfer, comprising:

a plurality of movable shelves, wherein each of the movable shelves is provided with a plurality of cargo boxes that are configured for allowing cargoes to be unloaded thereinto, and the each of the movable shelves is fixed with at least one identification device and is configured for moving to any unoccupied unloading region;

a plurality of sorting robots, configured for traveling on a sorting platform, wherein each of the sorting robots is configured for transporting received cargoes to a designated unloading region for unloading the received cargoes;

a sorting robot locating device, configured for locating the plurality of the sorting robots;

at least one importing device, which is provided at a cargo entrance of the sorting platform, and configured for identifying and importing the cargoes;

unloading robots, configured for receiving cargoes unloaded by the sorting robots, and unloading the cargoes in predetermined unoccupied cargo boxes of the movable shelves;

detection devices, each of which is fixed on a ground of a corresponding unloading region, or on an unmovable fixed element in a corresponding unloading robot, where the detection devices are configured for collecting information of the identification devices; and a server, which is in a wireless connection with controllers of the sorting robots, and is in a wired or wireless connection with controllers of the unloading robots, the detection devices, and the at least one importing device.

2. The robot cargo sorting system capable of identifying shelf transfer according to claim 1, wherein the each of the movable shelves is provided as being of a plurality of layers, each of the plurality of the layers is provided with a plurality of cargo boxes, the plurality of cargo boxes on the plurality of the layers are arranged in a matrix, and each of the plurality of cargo boxes is detachable.

3. The robot cargo sorting system capable of identifying shelf transfer according to claim 1, wherein each of the unloading regions is provided with two detection devices, and correspondingly, the each of the movable shelves is provided with two identification devices, wherein when the two detection devices are aligned with the two identification devices respectively, the each of the movable shelves is accurately located.

4. The robot cargo sorting system capable of identifying shelf transfer according to claim 1, wherein the at least one identification device is a two-dimensional code or a barcode, and the corresponding detection device is a camera; or, the at least one identification device is a RFID electronic tags, and the corresponding detection device is a card reader.

5. The robot cargo sorting system capable of identifying shelf transfer according to claim 1, wherein each of the detection devices is fixed on a corresponding sorting site or on the unmovable fixed elements of the corresponding unloading robot.

6. The robot cargo sorting system capable of identifying shelf transfer according to claim 1, wherein each of the plurality of the unloading robots comprises a vertical moving device, two horizontal moving devices that are arranged in parallel, and a flipping device, wherein each of the horizontal moving devices comprises:

a hollow rod, which is fixed to the ground by a bracket, wherein the hollow rod is mounted horizontally and provided with an opening end, and two outer side surfaces of the hollow rod are each provided with a groove;

a first synchronous pulley and a second synchronous pulley, which are rotatably fixed at two ends inside the hollow rod, respectively;

a synchronous belt, which connects the first synchronous pulley and the second synchronous pulley;

a servomotor, having a housing fixed to the hollow rod and a rotating shaft fixed to a central axis of the first synchronous pulley or a central axis of the second synchronous pulley, wherein the servomotor is electrically connected to a controller of the unloading robot; and a sliding block, which is provided with a protrusion block and two sliding rails, wherein the protrusion block is configured for being embedded in the opening end of the hollow rod, and is fixed to the synchronous belt, and the two sliding rails are configured for only moving back and forth along the grooves, wherein a structure of the vertical moving device is same as structures of the horizontal moving devices, a hollow rod of the vertical moving device is vertically arranged, and two ends of the hollow rod of the vertical moving device are fixed to the sliding blocks of the two horizontal moving devices, respectively; and the flipping device comprises:

a conveying frame, which is fixed to the sliding block of the vertical moving device;

a first decelerator;

a flipping motor, having a housing fixed to a housing of the first decelerator and a rotating shaft fixed to an input shaft of the first decelerator, wherein the flipping motor is electrically connected to the controller of the unloading robot;

at least one flipping bracket, which is fixed to an output shaft of the first decelerator;

a flipping plate, which is fixed to the at least one flipping bracket, wherein the flipping plate is configured for holding or unloading the cargoes;

a second decelerator, a housing of which is fixed to the conveying frame;

a swing motor, having a housing fixed to the housing of the second decelerator and a rotating shaft fixed to an input shaft of the second decelerator, wherein the swing motor is electrically connected to the controller of the unloading robot; and at least one swing rod, having one end fixed to an output shaft of the second decelerator, and the other end fixed to the housing of the first decelerator, wherein the swing motor is configured for rotating to drive the flipping plate with the cargoes to swing from an outside of the movable shelf to above a predetermined cargo box, and the flipping motor is configured for rotating to unload cargoes into the cargo box.

7. The robot cargo sorting system capable of identifying shelf transfer according to claim 6, wherein the vertical moving device is configured for controlling the flipping device to move in a height direction of the corresponding movable shelf.

8. The robot cargo sorting system capable of identifying shelf transfer according to claim 6, wherein the flipping device is configured for controlling the cargoes to move along a circumferential trajectory in a horizontal direction, and flipping to unload the cargoes.

9. The robot cargo sorting system capable of identifying shelf transfer according to claim 6, wherein the flipping device comprises two swing rods, and the swing rods are located on a top surface and a bottom surface of the housing of the first decelerator, respectively.

10. The robot cargo sorting system capable of identifying shelf transfer according to claim 6, wherein the flipping plate is configured for unloading cargoes on any one of the movable shelves at two sides.

11. The robot cargo sorting system capable of identifying shelf transfer according to claim 6, wherein the each of the movable shelves is provided as being of a plurality of layers, each of the plurality of the layers is provided with a plurality of cargo boxes, the plurality of cargo boxes on the plurality of the layers are arranged in a matrix, and each of the plurality of cargo boxes is detachable.

12. The robot cargo sorting system capable of identifying shelf transfer according to claim 6, wherein each of the unloading regions is provided with two detection devices, and correspondingly, the each of the movable shelves is provided with two identification devices, wherein when the two detection devices are aligned with the two identification devices respectively, the each of the movable shelves is accurately located.

13. The robot cargo sorting system capable of identifying shelf transfer according to claim 6, wherein each of the detection devices is fixed on a corresponding sorting site or on the unmovable fixed elements of the corresponding unloading robot.

14. The robot cargo sorting system capable of identifying shelf transfer according to claim 6, wherein the two horizontal moving devices that are arranged in parallel are configured for controlling the vertical moving device to move in a length direction of the corresponding movable shelf.

15. The robot cargo sorting system capable of identifying shelf transfer according to claim 14, wherein the vertical moving device is configured for controlling the flipping device to move in a height direction of the corresponding movable shelf.

16. The robot cargo sorting system capable of identifying shelf transfer according to claim 14, wherein the flipping device is configured for controlling the cargoes to move along a circumferential trajectory in a horizontal direction, and flipping to unload the cargoes.

17. The robot cargo sorting system capable of identifying shelf transfer according to claim 14, wherein the flipping device comprises two swing rods, and the swing rods are located on a top surface and a bottom surface of the housing of the first decelerator, respectively.

18. A robot cargo sorting method capable of identifying shelf transfer, applicable to the robot cargo sorting system capable of identifying shelf transfer according to claim 1, wherein the sorting method of the robot cargo sorting system comprises following steps:

S1. selecting one of the movable shelves, wherein on the movable shelf, at least one cargo box is unoccupied cargo box without cargoes; and moving the movable shelf to any unoccupied unloading region for waiting for unloading;

S2. reading the at least one identification device of the movable shelf on the unloading region through the at least one detection device fixed on the unloading region;

S3. the server starting dispatch according to information of the unoccupied cargo box on the movable shelf, unloaded cargoes, and cargoes to be unloaded, obtained from the at least one identification device;

S4. transporting the cargoes by the sorting robots to a place close to the unloading region so that the unloading robot is capable of receiving the cargoes, when the cargoes sorted by the sorting robots are to be unloaded in the unoccupied cargo box;

S5. the unloading robot of the unloading region receiving the cargoes unloaded by the sorting robots and then unloading the cargoes into the predetermined unoccupied cargo box; and S6. the movable shelf moving to a packing region for packing, after the unoccupied cargo box on the movable shelf is filled with predetermined cargoes.

19. The robot cargo sorting method capable of identifying shelf transfer according to claim 18, wherein that at least one cargo box in the plurality of cargoes on the movable shelf is an unoccupied cargo box without cargoes in the step S1 refers to that: the movable shelf is not loaded with the cargoes; the cargoes on the movable shelf have been unloaded and the moveable shelf is available for reloading; or, the movable shelf is loaded with cargoes before, but unloading is interrupted when the movable shelf is not full of the cargoes, so that the unloading region and the unloading robot are to be replaced to continue the unloading.

20. The robot cargo sorting method capable of identifying shelf transfer according to claim 18, wherein when one of the unloading robots needs is interrupted, an adjacent unloading robot can unload cargoes on the movable shelf after re-dispatching by the server.

* * * * *